United States Patent [19]

Flowers

[11] 4,277,534
[45] Jul. 7, 1981

[54] ELECTRICAL INSULATING COMPOSITION COMPRISING AN EPOXY RESIN, A PHENOLIC RESIN AND A POLYVINYL ACETAL RESIN IN COMBINATION

[75] Inventor: Ralph G. Flowers, Pittsfield, Mass.

[73] Assignee: General Electric Company, New York, N.Y.

[21] Appl. No.: 103,080

[22] Filed: Dec. 12, 1979

[51] Int. Cl.³ .................. B32B 15/02; B32B 15/08; H01B 3/36; H01B 3/40; H01B 3/42
[52] U.S. Cl. ................... 428/379; 174/110 SR; 174/110 E; 427/25; 427/26; 427/120; 427/358; 427/375; 427/379
[58] Field of Search ............... 428/375, 379; 427/25, 427/26, 120, 358, 379, 375; 174/110 SR, 110 E

[56] References Cited

U.S. PATENT DOCUMENTS

| Re. 25,625 | 7/1964 | Been ........................... 525/187 |
| 3,239,598 | 3/1966 | Olson et al. ................. 427/116 |
| 4,215,174 | 7/1980 | Flowers ........................ 428/375 |

Primary Examiner—James C. Cannon
Attorney, Agent, or Firm—Richard A. Menelly

[57] ABSTRACT

An electrically insulating wire coating material comprises the reaction product of a mixture of polyvinyl acetal, phenol aldehyde resin and epoxy resin in a particular range of proportions. The mixture is formed into a powder for applying to a wire without the use of solvents, the coated wire being heated to harden the applied coating. The mixture can also be applied as a high solid enamel by the use of a small amount of solvent.

8 Claims, 2 Drawing Figures

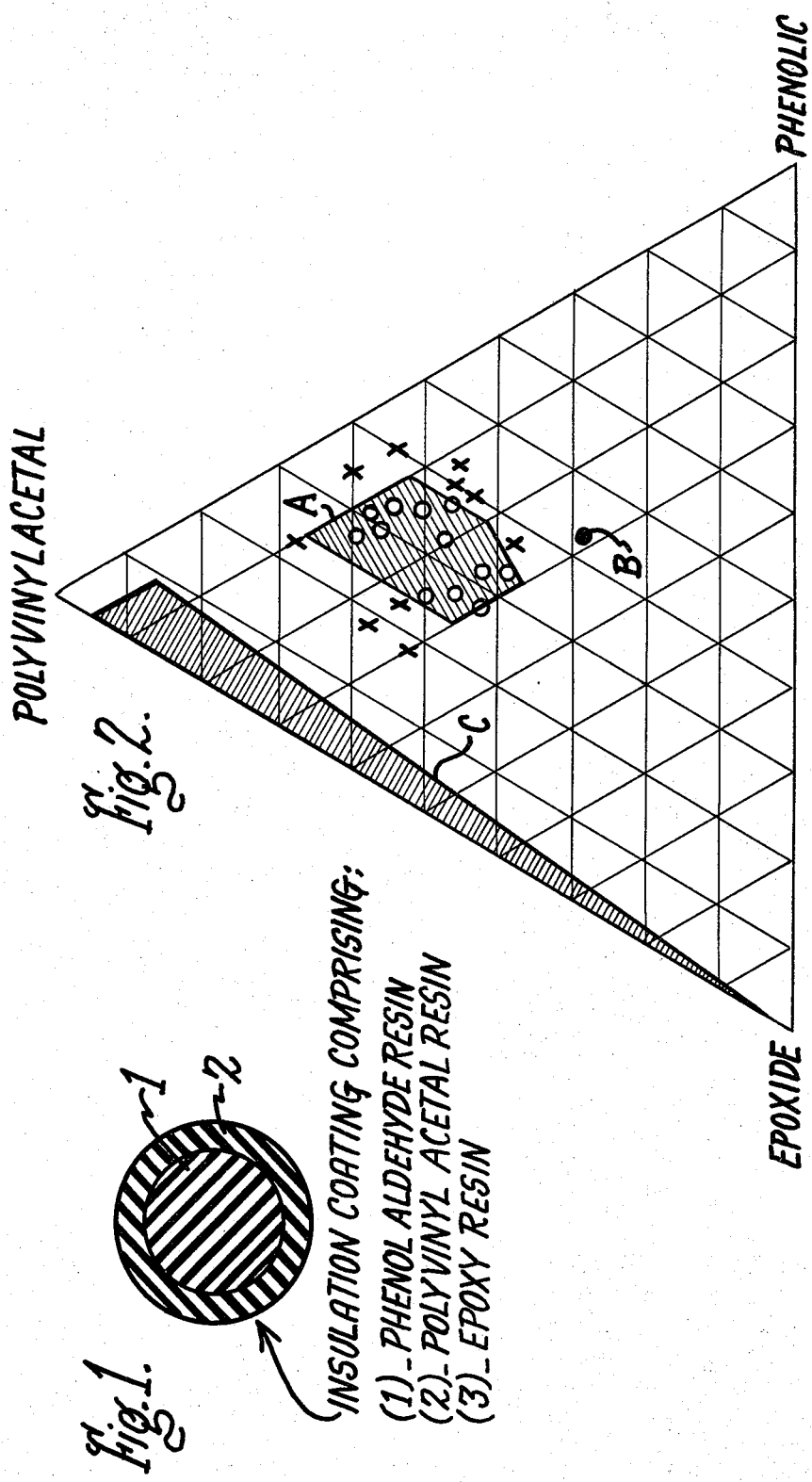

4,277,534

ELECTRICAL INSULATING COMPOSITION COMPRISING AN EPOXY RESIN, A PHENOLIC RESIN AND A POLYVINYL ACETAL RESIN IN COMBINATION

BACKGROUND OF THE INVENTION

This invention relates to enameling and powder compositions used as an insulating coating material for transformer wire. One of the problems involved with current methods and materials used in manufacturing and applying transformer wire coatings is the need for a suitable solvent for dissolving the coating constituents and providing a low viscosity solution. Since the solvents currently utilize expensive hydrocarbon and cresols, other materials are continuously being evaluated in an attempt to reduce the quantity of solvents employed. Over the past 15 years for example, an insulating coating composition consisting of a mixture of polyvinyl acetal and phenolic was reduced in solvent from 85 weight percent down to 75 percent. This reduction was realized by variations in the polyvinyl acetal and phenolic materials as well as a selected combination of hydrocarbon and cresol solvents. Besides the expense involved in utilizing liquid solvents in the wire coating industry, requirements are now being made by the Environmental Protection Agency to reduce solvent usage by a substantial amount in order to reduce the overall concentration of solvents existing in the atmosphere.

U.S. Patent Applications Ser. No. 889,889 filed Mar. 24, 1978, now U.S. Pat. No. 4,215,174 and Ser. No. 595,034 filed July 11, 1975, now abandoned, disclose a three component wire insulating composition which includes an epoxy resin in combination with polyvinyl acetal and phenolic resins. The three component composition further reduced the solvent content down to 70 weight percent and less by taking advantage of the good film-forming properties of the epoxy resin. The use of an epoxy wire coating per se has not heretofore proven feasible due to the poor hydrolytic stability existing with known epoxy compounds. When transformer wires are coated for electrical insulating purposes, and are subjected to long exposure times in the presence of heat and moisture, it is essential that the coating remain electrically stable. Hydrolytic stability therefore is an important parameter for evaluating efficient transformer wire insulating materials. In order to determine hydrolytic stability, the transformer wire coatings are subjected to moisture and temperature for a prescribed period of time and are subsequently measured to determine whether the electrical insulating properties have deteriorated. Wires coated with epoxy compounds per se become hydrolytically unstable and are infeasible for long term transformer wire coatings.

Another requirement for transformer wire coating materials is a low dissipation factor. Since the electrical properties of the coating depend to a large extent upon the transformer operating temperature, the wire coating materials must be able to withstand the high temperatures involved under short circuit load conditions. In order for the transformer wire coating to be electrically and thermally stable, the dissipation factor, which is a fairly good indication of the ability of the coating to dissipate heat, must be determined at various operating temperatures. If the transformer wire coating has too high a dissipation factor, thermal runaway can occur causing insulation decrease to an inoperable value.

Formulations intended for use as insulating coatings must be carefully evaluated for temperature, moisture and overall electrical stability for long periods of time in order to ensure that short circuits do not occur due to electrical insulation failure. As described earlier, various epoxy resin compositions were hydrolytically unstable and unsuitable per se as wire coatings. Attempts to combine epoxy resins, phenolic resins, and polyvinyl acetal such as suggested within U.S. Pat. No. Re. 25,625 have not proven successful when evaluated for transformer wire coatings. Coatings prepared from the aforementioned re-issued patent were too inflexible to withstand the transformer winding operation. Wire coatings prepared from the adhesive composition disclosed within U.S. Pat. No. 3,239,598 resulted in wire coatings having an excessive dissipation factor and poor flexibility.

SUMMARY OF THE INVENTION

The three component coating composition disclosed herein results in wire coatings having good flexibility, low dissipation factor and hydrolytic stability. The addition of epoxy resin to the polyvinyl acetal and phenolic resins substantially improved the flow properties of the coating during the coating process. The epoxy resin ranges from 10–30 percent by weight, the phenolic resin ranges from 24–38 percent and the polyvinyl acetal resin ranges from 36 to 66 percent. The ratio of the polyvinyl acetal to phenolic must be greater than 1.1 in order to produce usable coatings. The insulating composition can be applied to transformer wires as a dry powder or as a liquid containing solvent.

BRIEF DESCRIPTION OF THE DRAWINGS

FIG. 1 is a cross sectional view of a transformer wire coated with a coating composition according to the invention; and FIG. 2 is a triaxial diagram of the coating composition of the invention including some state of the art wire coating compositions.

GENERAL DESCRIPTION OF THE INVENTION

The aforementioned U.S. Patent Applications disclose the combination of the reaction product of a mixture of polyvinyl acetal resin, phenol aldehyde resin and epoxy resin in a particular range of proportions for electrically insulating coatings for transformer wires. Transformer wire coatings to be subjected to the high temperatures and moisture conditions existing within a transformer enclosure must have a low dissipation factor, good flexibility and be hydrolytically stable for the reasons discussed earlier. The aforementioned U.S. Patent Applications carefully controlled the range of the three constituents to ensure that no problem in flexibility, dissipation factor or hydrolytic stability would occur. In the coating of the instant invention, the phenol aldehyde resin was kept at less than 40% in order not to reduce the flexibility and at least 20% in order to avoid an excessively high dissipation factor. The polyvinyl acetal resin was kept at less than 65% in order not to create an excessively high-dissipation factor while at least 40% was required to provide satisfactory flexibility. The epoxy concentration was kept at less than 30 percent to avoid both high dissipation factor problems as well as hydrolytic instability. At least 10 percent of the epoxy was required however to promote adequate fusion of the powder particles and to impart uniformity to the coating. The wet die technique was chosen as the test method of application for purposes of convenience in applying the coating of this invention to the wire. After dissolving samples containing increasing amounts of epoxy resin, plastic films were cast from the samples for the purpose of hydrolytic stability and dissipation factor measurements.

The compositional range disclosed within the aforementioned U.S. reissue patent is shown at C and encompasses high dissipation problems at the high polyvinyl acetal end of the range and problems with hydrolytic stability at the high epoxy end. The composition disclosed within the aforementioned U.S. Patent is shown at B and exhibits poor flexibility when evaluated as a wire coating material.

DESCRIPTION OF THE PREFERRED EMBODIMENT

In order to determine operability as an insulating coating the resins were evaluated for flexibility and hydrolytic stability using standard techniques. The samples which showed good hydrolytic stability and good flexibility as well as a dissipation factor of less than 25 percent at 170° C. were considered to pass the evaluation. Coatings having dissipation factors in excess of 25 percent at 170° C. and/or having poor electrolytic stability and poor flexibility failed the evaluation.

A plurality of compositions were prepared having the values listed in Table I.

The samples which failed any of the aforementioned parameters are indicated by crosses and the samples which passed all the parameters are indicated by circles, both in Table I as well as in FIG. 2, to show the effective range of both the epoxy content, polyvinyl acetal and phenolic constituents. It is to be noted that region A encompasses the operational range of constituents tested and that the compositions shown at B and C are outside the operational range. The compositions prepared using the resin materials included within Region A of FIG. 2 were applied to transformer wires by a wet floating die process in one case and by a dry electrostatic process in another. In both methods of application the resulting coatings exhibited dissipation factors less than 25 percent at 170° C. with good continuous and flexible coatings that were also hydrolytically stable. In the solvent application system, the solvent represented approximately 60 percent by weight of the total solution whereas the composition applied by entraining the dry powder in a fluidized bed gas stream and applying a high voltage electrostatic DC field between the powder and the transformer wire equally adhered without any solvents at all. The wire was heated to a first temperature range of from 125° to 200° C. to fuse the coating and then to a second higher temperature of from 200° to 400° C. to cause the resins to react.

Although the improved wire enamel composition of the invention is disclosed for use within power transformers this is by way of example only. The improved wire coating composition of the invention and the methods of application thereof find application wherever electrically insulating wire coatings may be required having good flexibility, low dissipation and good hydrolytic stability.

TABLE I

| Formulation | % Epoxide | % Formvar | % Phenolic | Ratio | 170° C. DF | Flex | Hydrolytic Stability | Ratings |
|---|---|---|---|---|---|---|---|---|
| ZC-12830 | 10 | 67 | 23 | 2.9 | 50 | Excellent | Poor | X |
| ZC-12831 | 25 | 38 | 37 | 1.0 | 16 | Poor | Good | X |
| ZC-12832 | 11 | 47 | 42 | 1.1 | 24 | Poor | Good | X |
| ZC-12833 | 24 | 58 | 18 | 3.2 | 33 | Excellent | Poor | X |
| ZC-12836 | 30 | 52 | 18 | 2.9 | 29 | Excellent | Poor | X |
| ZC-12841 | 30 | 42 | 28 | 1.5 | 16 | Excellent | Good | 0 |
| ZC-12842 | 26 | 42 | 32 | 1.3 | 14 | Good | Good | 0 |
| ZC-12843 | 26.5 | 46 | 27.5 | 1.7 | 14 | Excellent | Good | 0 |
| ZC-12844 | 30 | 42 | 28 | 1.5 | 16 | Excellent | Good | 0 |
| ZC-12834 | 5 | 60 | 35 | 1.7 | 35 | Poor | Good | X |
| ZC-12837 | 5 | 55 | 40 | 1.4 | 33 | Poor | Good | X |
| ZC-12807 | 20 | 47 | 33 | 1.4 | — | Good | Good | 0 |
| ZC-12814 | 20 | 47 | 33 | 1.4 | 16 | Excellent | Good | 0 |
| ZC-12529 | 15 | 50 | 35 | 1.43 | 18 | Good | Good | 0 |
| ZC-12530 | 25 | 50 | 25 | 2.0 | 26 | Good | Good | 0 |
| ZC-12525 | 15 | 45 | 40 | 1.13 | — | Good | Poor | X |
| ZC-12527 | 10 | 50 | 40 | 1.25 | — | Good | Poor | X |
| ZC-13042 | 23.2 | 53.7 | 23.0 | 2.33 | 26 | Excellent | Poor | X |
| ZC-13043 | 17.1 | 59.2 | 23.7 | 2.5 | 18 | Excellent | Good | 0 |
| ZC-13044 | 18 | 56 | 30 | 1.87 | 18 | Excellent | Good | 0 |
| ZC-13045 | 12.5 | 59.6 | 27.8 | 2.14 | 18 | Good | Good | 0 |
| ZC-13046 | 10.5 | 57.7 | 31.8 | 1.81 | 14 | Good | Good | 0 |
| ZC-13047 | 22 | 42 | 36 | 1.17 | 14 | Good | Good | 0 |
| ZC-13048 | 28 | 38 | 34 | 1.12 | 13 | Good | Good | 0 |
| ZC-13049 | 12.1 | 47.5 | 40.4 | 1.18 | 39 | Good | Good | X |
| ZC-13050 | 16 | 46 | 38 | 1.21 | 16 | Good | Good | 0 |
| ZC-13051 | 12 | 54 | 34 | 1.59 | 14 | Good | Good | 0 |

0-Pass
X-Fail

What I claim as new and desire to secure by Letters Patent is:

1. A transformer wire having an insulating coating thereon, said coating having the composition defined within the accompanying triaxial diagram of FIG. 2 with the proviso that the composition contains from 10 to up to but not inclusive of 30% by weight epoxy resin.

2. A transformer wire having an insulating coating thereon consisting of from 10 to up to but not inclusive of 30 percent by weight epoxy resin, 24-38 percent phenolic resin and 36 to 66 percent polyvinyl acetal resin.

3. A method for preparing electrical insulating coatings for transformer wires comprising the steps of:
preparing a composition from 10 to up to but not inclusive of 30 percent by weight epoxy resin, 24–38 percent phenolic resin and 36 to 66 percent polyvinyl acetal resin;
applying the composition to the transformer wire;
heating the coated transformer wire to a first temperature to fuse the coating; and
heating the coated wire to a second temperature to cause the coating to react.

4. The method of claim 3 wherein the step of applying the composition to the wire comprises passing the wire through the composition and a coating die.

5. The method of claim 3 wherein the step of applying the compositions to the wire comprises electrostatic coating.

6. The method of claim 3 wherein the second temperature is higher than the first temperature.

7. The method of claim 3 further including the addition of a solvent.

8. The method of claim 3 wherein the first temperature range is from 125° to 200° C. and the second temperature range is from 200° to 400° C.

* * * * *